(12) United States Patent
Boyle et al.

(10) Patent No.: US 7,996,227 B2
(45) Date of Patent: Aug. 9, 2011

(54) SYSTEM AND METHOD FOR INSERTING A DESCRIPTION OF IMAGES INTO AUDIO RECORDINGS

(75) Inventors: Peter C. Boyle, Burnaby (CA); Yu Zhang, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 11/866,495

(22) Filed: Oct. 3, 2007

(65) Prior Publication Data

US 2008/0114601 A1 May 15, 2008

(30) Foreign Application Priority Data

Nov. 9, 2006 (CA) ................................. 2567505

(51) Int. Cl.
*G10L 11/00* (2006.01)
*G10L 15/26* (2006.01)
*G06F 17/27* (2006.01)
*G06K 9/72* (2006.01)

(52) U.S. Cl. ............. 704/270; 704/9; 704/235; 382/229

(58) Field of Classification Search ................... None
See application file for complete search history.

(56) References Cited

U.S. PATENT DOCUMENTS

| | | | | |
|---|---|---|---|---|
| 5,677,739 A * | 10/1997 | Kirkland | ........................ | 348/468 |
| 5,729,741 A * | 3/1998 | Liaguno et al. | ........................ | 1/1 |
| 6,243,713 B1 * | 6/2001 | Nelson et al. | ........................ | 1/1 |
| 6,901,585 B2 * | 5/2005 | Dutta et al. | .................... | 717/143 |
| 6,941,509 B2 | 9/2005 | Harris | | |
| 7,515,770 B2 * | 4/2009 | Fukada | ........................ | 382/284 |
| 7,680,654 B2 * | 3/2010 | Goronzy et al. | ............. | 704/231 |
| 2002/0032815 A1 | 3/2002 | Chiba et al. | | |
| 2004/0141630 A1 * | 7/2004 | Bhaskaran et al. | ........... | 382/100 |
| 2004/0181412 A1 * | 9/2004 | Menhardt | ..................... | 704/270 |
| 2006/0015342 A1 * | 1/2006 | Kurzweil et al. | ............. | 704/260 |

OTHER PUBLICATIONS

Roth et al., "An Audio-Haptic Tool for Non-Visual Image Representation", Proceedings of the Sixth International Symposium on Signal Processing and its Applications (Cat. No. 01EX467), 2001, vol. 1, pp. 64-67.

* cited by examiner

*Primary Examiner* — Brian L Albertalli
(74) *Attorney, Agent, or Firm* — Hoffman Warnick LLC

(57) ABSTRACT

There is disclosed a system and method for interpreting and describing graphic images. In an embodiment, the method of inserting a description of an image into an audio recording includes: interpreting an image and producing a word description of the image including at least one image keyword; parsing an audio recording into a plurality of audio clips, and producing a transcription of each audio clip, each audio clip transcription including at least one audio keyword; calculating a similarity distance between the at least one image keyword and the at least one audio keyword of each audio clip; and selecting the audio clip transcription having a shortest similarity distance to the at least one image keyword as a location to insert the word description of the image. The word description of the image can then be appended to the selected audio clip to produce an augmented audio recording including the interpreted word description of the image.

21 Claims, 11 Drawing Sheets

SYSTEM AND METHOD FOR INSERTING A DESCRIPTION OF IMAGES INTO AUDIO RECORDINGS

COPYRIGHT NOTICE

A portion of the disclosure of this patent document contains material which is subject to copyright protection. The copyright owner has no objection to the facsimile reproduction of the patent document or the patent disclosure, as it appears in the United States Patent and Trademark Office patent file or records, but otherwise reserves all copyright rights whatsoever.

BACKGROUND OF THE INVENTION

1. Field of the Invention

The present invention relates to systems and methods for inserting a description of images into audio recordings.

2. Related Art

Recording a lecture or a presentation in an audio format can be a convenient and effective way to disseminate information beyond the immediate audience. However, if the presentation contains images, diagrams and charts, the lack of visual content can have a significant impact on the effectiveness of the delivery.

SUMMARY OF THE INVENTION

The present invention relates to a system and method for inserting a description of images into audio recordings.

A method in accordance with an embodiment of the present invention begins by interpreting images through deciphering non-text content, compiling any meta-tag information, collecting optical character recognition (OCR) data, and/or the like. The method then integrates, filters, and prioritizes the information to create a useful and succinct non-visual (e.g., audio, text, etc.) description of the image. The results of this image interpretation and description augment the non-visual content when the images are not available, such as when listening to an audio recording, or hearing a text-to-speech system read the text. For example, the system can interpret common presentation and graphics programs and insert a description of the images in an audio recording of the presentation.

In an aspect, there is provided a method of inserting a description of an image into an audio recording, comprising: interpreting an image and producing a word description of the image including at least one image keyword; parsing an audio recording into a plurality of audio clips and producing a transcription of each audio clip, each audio clip transcription including at least one audio keyword; calculating a similarity distance between the at least one image keyword and the at least one audio keyword of each audio clip; and selecting the audio clip transcription having a shortest similarity distance to the at least one image keyword as a location to insert the word description of the image.

In an embodiment, the method further comprises appending the word description of the image to the selected audio clip to produce an augmented audio recording including at least one interpreted word description of an image.

In another embodiment, the method further comprises providing at least one template to interpret the image, the at least one template including at least one image interpretation component to produce a word description of the image.

In another embodiment, the method further comprises providing at least one of optical character recognition (OCR) technology, edge finding technology, color edge finding technology, curve finding technology, shape finding technology, and contrast finding technology as an image interpretation component in the at least one template.

In another embodiment, the method further comprises parsing the audio recording into a plurality of audio clips of substantially the same length, and adjusting the length of each audio clip to end at a natural pause in speech.

In another embodiment, the method further comprises calculating the similarity distance between the image and an audio clip by calculating the similarity distance between at least one image keyword of an image and the at least one audio keyword of an audio clip.

In another embodiment, the method further comprises obtaining the similarity distance between the at least one image keyword and the at least one audio keyword by calculating a path length between these keywords in a hierarchical semantic electronic dictionary.

In another aspect, there is provided a system for inserting a description of an image into an audio recording, comprising: an interpreting system for interpreting an image and producing a word description of the image including at least one image keyword; a parsing system for parsing an audio recording into a plurality of audio clips and for producing a transcription of each audio clip, each audio clip transcription including at least one audio keyword; a calculating system for calculating a similarity distance between the at least one image keyword and the at least one audio keyword of each audio clip; and a selecting system for selecting the audio clip transcription having a shortest similarity distance to the at least one image keyword as a location to insert the word description of the image.

In an embodiment, the system further comprises an appending system for appending the word description of the image to the selected audio clip to produce an augmented audio recording including at least one interpreted word description of an image.

In another embodiment, the system further comprises at least one template to interpret the image, the at least one template including at least one image interpretation component to produce a word description of the image.

In another embodiment, the system further comprises at least one of optical character recognition (OCR) technology, edge finding technology, color edge finding technology, curve finding technology, shape finding technology, and contrast finding technology as an image interpretation component in the at least one template.

In another embodiment, the system is configured to parse the audio recording into a plurality of audio clips of substantially the same length and adjust the length of each audio clip to end at a natural pause in speech.

In another embodiment, the system is configured to calculate the similarity distance between the image and an audio clip by calculating the similarity distance between at least one image keyword of an image and the at least one audio keyword of an audio clip.

In another embodiment, the system is configured to calculate the similarity distance between the at least one image keyword and the at least one audio keyword based a path length between these keywords in a hierarchical semantic electronic dictionary.

In another aspect, there is provided a program product stored on a computer readable medium, which when executed, inserts a description of an image into an audio recording, the computer readable medium comprising program code for: interpreting an image and producing a word description of the image including at least one image keyword; parsing an audio recording into a plurality of audio clips and producing a transcription of each audio clip, each audio clip transcription including at least one audio keyword; calculating a similarity distance between the at least one image keyword and the at least one audio keyword of each audio clip; and selecting the audio clip transcription having a shortest similarity distance to the at least one image keyword as a location to insert the word description of the image.

In an embodiment, the program product further comprises program code for appending the word description of the image to the selected audio clip to produce an augmented audio recording including at least one interpreted word description of an image.

In an embodiment, the program product further comprises program code for providing at least one template to interpret the image, the at least one template including at least one image interpretation component to produce a word description of the image.

In an embodiment, the program product further comprises program code for providing at least one of optical character recognition (OCR) technology, edge finding technology, color edge finding technology, curve finding technology, shape finding technology, and contrast finding technology as an image interpretation component in the at least one template.

In an embodiment, the program product further comprises program code for parsing the audio recording into a plurality of audio clips of substantially the same length, and adjusting the length of each audio clip to end at a natural pause in speech.

In an embodiment, the program product further comprises program code for calculating the similarity distance between the image and an audio clip by calculating the similarity distance between at least one image keyword of an image and the at least one audio keyword of an audio clip.

In an embodiment, the program product further comprises program code for obtaining the similarity distance between the at least one image keyword and the at least one audio keyword by calculating a path length between these keywords in a hierarchical semantic electronic dictionary.

These and other aspects of the invention will become apparent from the following more particular descriptions of exemplary embodiments.

BRIEF DESCRIPTION OF THE DRAWINGS

These and other features of the present invention will be more readily understood from the following detailed description taken in conjunction with the accompanying drawings.

DETAILED DESCRIPTION OF THE INVENTION

As noted above, the present invention relates to a system and method for interpreting and describing graphic images.

Figure 1:
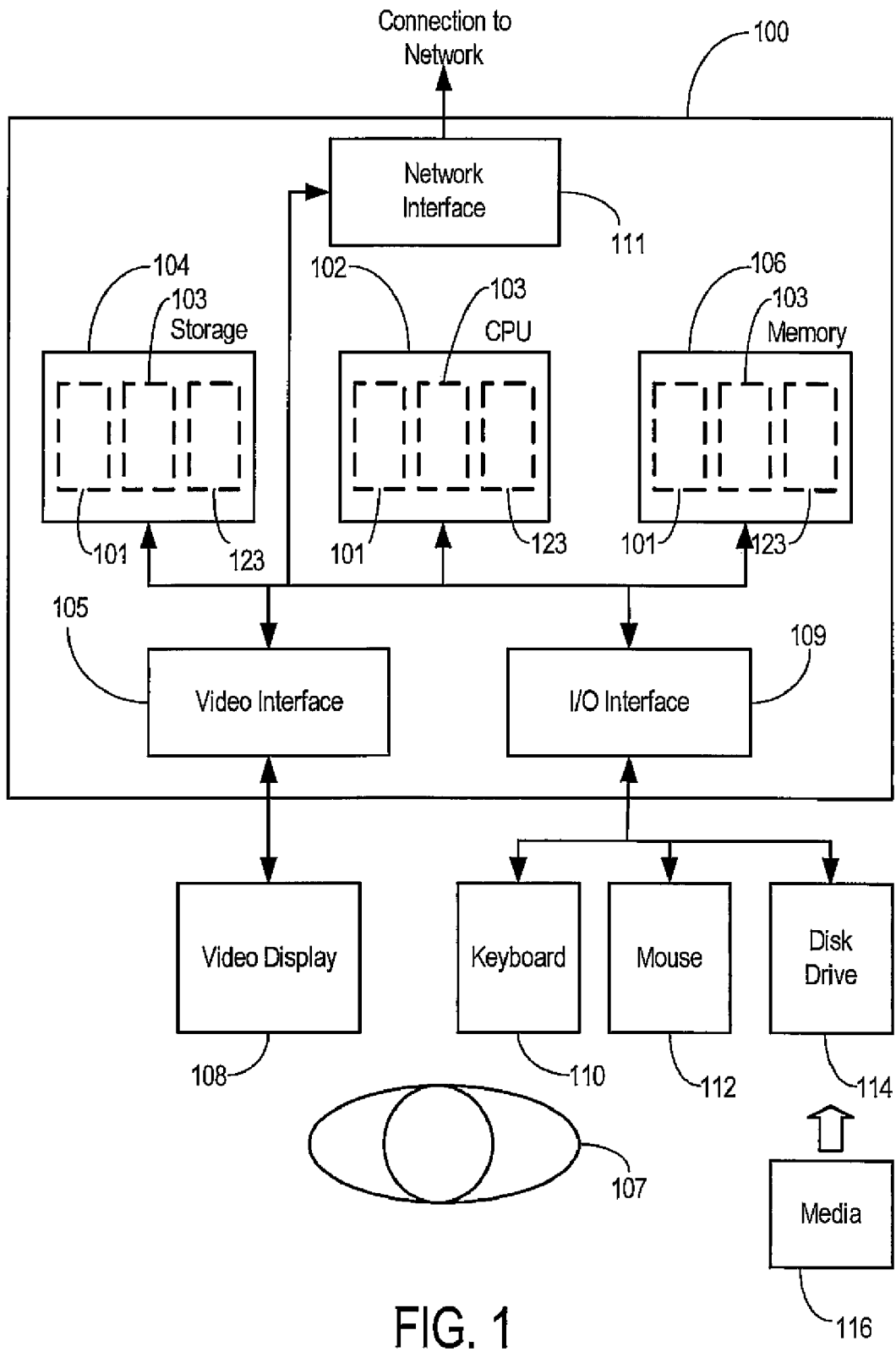
FIG. 1 is a schematic diagram of a generic data processing system that can provide an operative environment for the present invention.

The invention can be practiced in various embodiments. A suitably configured data processing system, and associated communications networks, devices, software, and firmware can provide a platform for enabling one or more of these systems and methods. By way of example, FIG. 1 shows a generic data processing system 100 that can include a central processing unit ("CPU") 102 connected to a storage unit 104 and to a random access memory 106. The CPU 102 can process an operating system 101, application program 103, and data 123. The operating system 101, application program 103, and data 123 can be stored in storage unit 104 and loaded into memory 106, as can be required. An operator 107 can interact with the data processing system 100 using a video display 108 connected by a video interface 105, and various input/output devices such as a keyboard 110, mouse 112, and disk drive 114 connected by an I/O interface 109. In known manner, the mouse 112 can be configured to control movement of a cursor in the video display 108, and to operate various graphical user interface ("GUI") controls appearing in the video display 108 with a mouse button. The disk drive 114 can be configured to accept data processing system readable media 116. The data processing system 100 can form part of a network via a network interface 111, allowing the data processing system 100 to communicate with other suitably configured data processing systems (not shown). The particular configurations shown by way of example in this specification are not meant to be limiting.

More generally, a method in accordance with an embodiment can involve interpreting and describing an image, and synchronizing the audio or text description with the logical insertion point in the audio or text transcript.

In interpreting the charts or diagrams, image pattern recognition technology can be used to identify the contents. Image processing technology can be used to extract text such as titles and notes. Meta-tagging technology can be used by the author, or by a contributor, and these tags can be used to augment and standardize the translation. Meta-tagging examples can include, for example, identifying the X and Y-axes, the chart type, segments of a chart, the legend, etc. Filtering technology can also be used to eliminate some data (such as page numbers, headers & footers) and highlight other information such as the chart title. As well, OCR technology can be used to determine other textual content. This OCR information can capture not only the text content, but also the position, orientation, text size and font, etc., and this information can be used in subsequent filtering and prioritization processes described further below.

Voice recognition technology can be used to assess the original source context and extract information that can help describe the content of the chart and/or help align the description of the image back into the original source content.

Translation technology can be employed to rephrase the content from one context to another context that it more suitable for the final purpose.

In accordance with another embodiment, the method can analyze other source content in relation to the interpreted images to align the two content types. Natural language processing and a semantic electronic dictionary can be used for measuring the semantic similarity distance between images and the other source content. Locations with the shortest similarity distance in the other source content can be used to place the images. Since most presentations often follow a logical order once a correct reference point is established, it is easier to place the interpreted image description back into the presentation.

Independent control over the descriptive additions allow the user to apply this method to previous and future image from the original source content. This will help align the deciphering system to the original audio or text that can then be used as a reference point to continue deciphering and alignment. The alignment process need only happen once as users can download the annotated version of the presentation, and not the source and the augmentation information separately.

Figure 2:
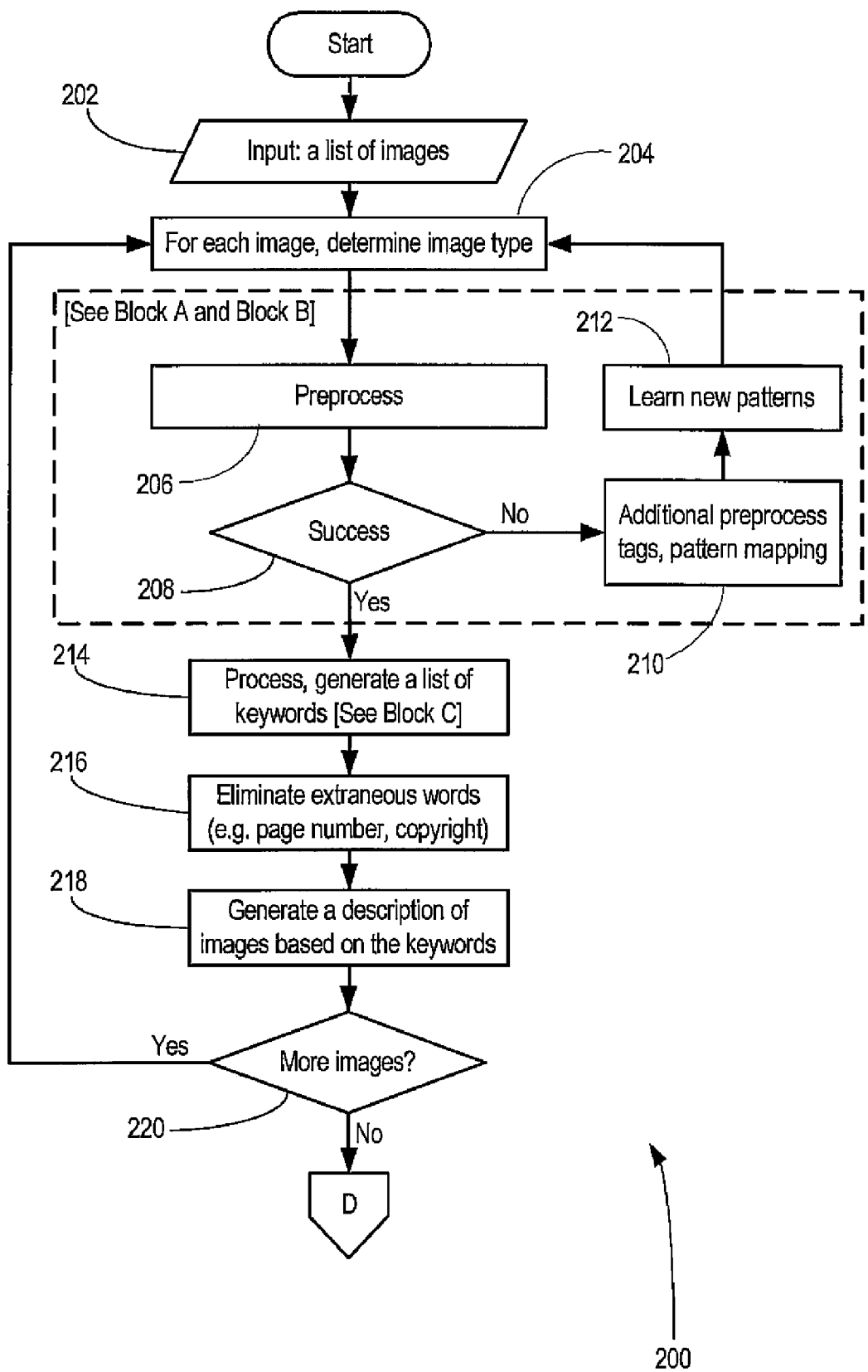
FIG. 2 shows a schematic flowchart of an illustrative image interpretation method in accordance with an embodiment of the present invention.

An illustrative method 200 in accordance with an embodiment of the present invention is now described with reference to FIG. 2. As shown, a list of images (e.g., as used in a presentation) is received at block 202 as an input. Method 200 then proceeds to block 204, where for each image, method 200 determines the image type. At block 206, method 200 pre-processes the image based on the image type (as described in further detail with respect to FIGS. 3A and 3B below), then proceeds to decision block 208 to evaluate the success of the image type determination. At decision block 208, if the answer is no, method 200 proceeds to block 210 for further pre-processing, possibly using meta-tags and pattern mapping, then to block 212 where method 200 can learn new patterns. Method 200 returns to block 204 with this new information for further pre-processing.

Figure 6:
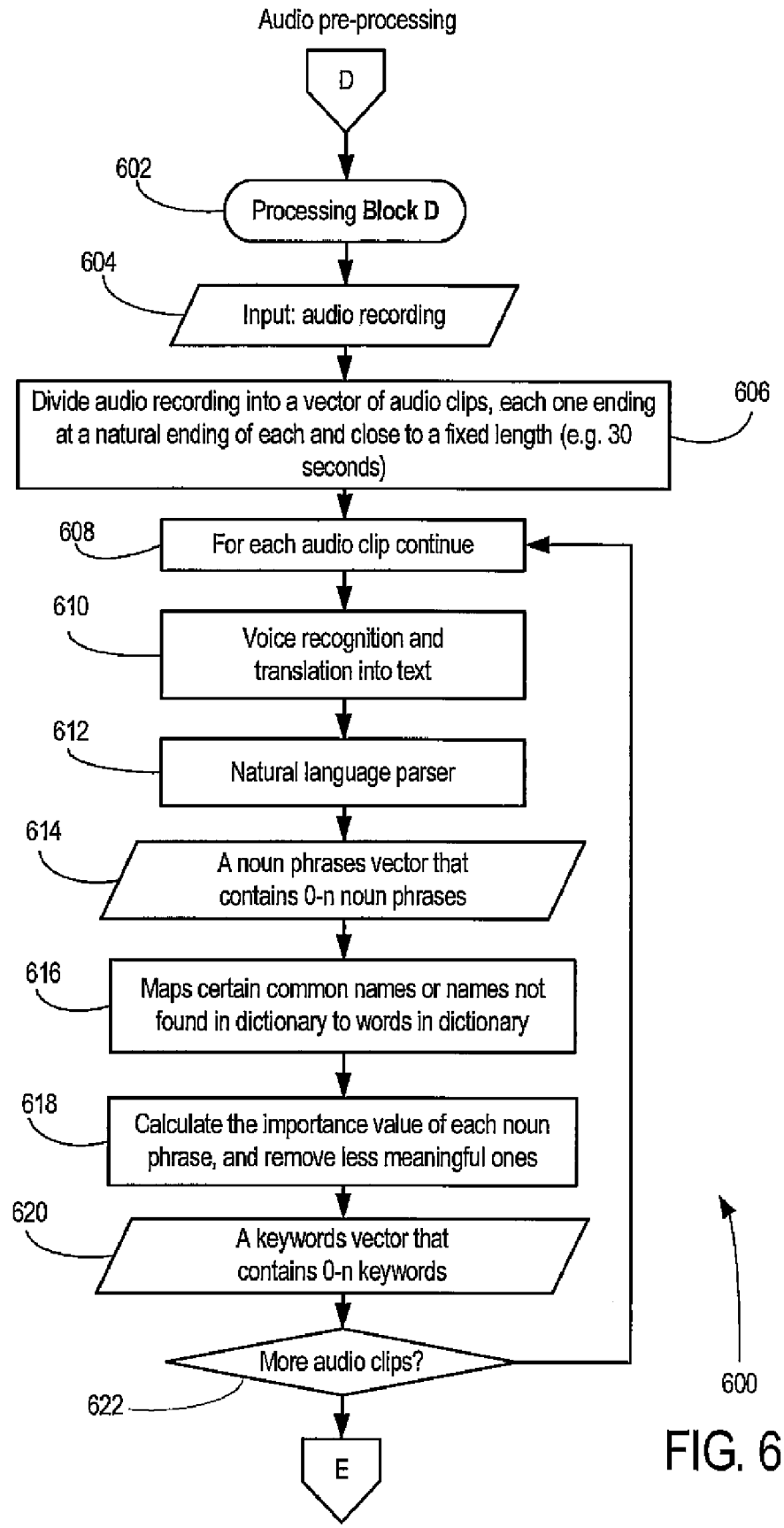
FIG. 6 shows a schematic flowchart of an illustrative sound recording pre-processing method in accordance with an embodiment of the present invention.

If, at decision block 208, the answer is yes, method 200 proceeds to block 214, where method 200 processes and generates a list of image keywords associated with the image. Method 200 then proceeds to block 216, where method 200 can eliminate extraneous words (e.g., page number, copyright notice). Method 200 then proceeds to block 218, where method 200 generates a description of the image based on the image keywords. Method 200 then proceeds to block 220, where method 200 determines if there are more images. If yes, method 200 returns to block 204 and continues. If no, method 200 proceeds to connector D (FIG. 6).

Figure 3A:
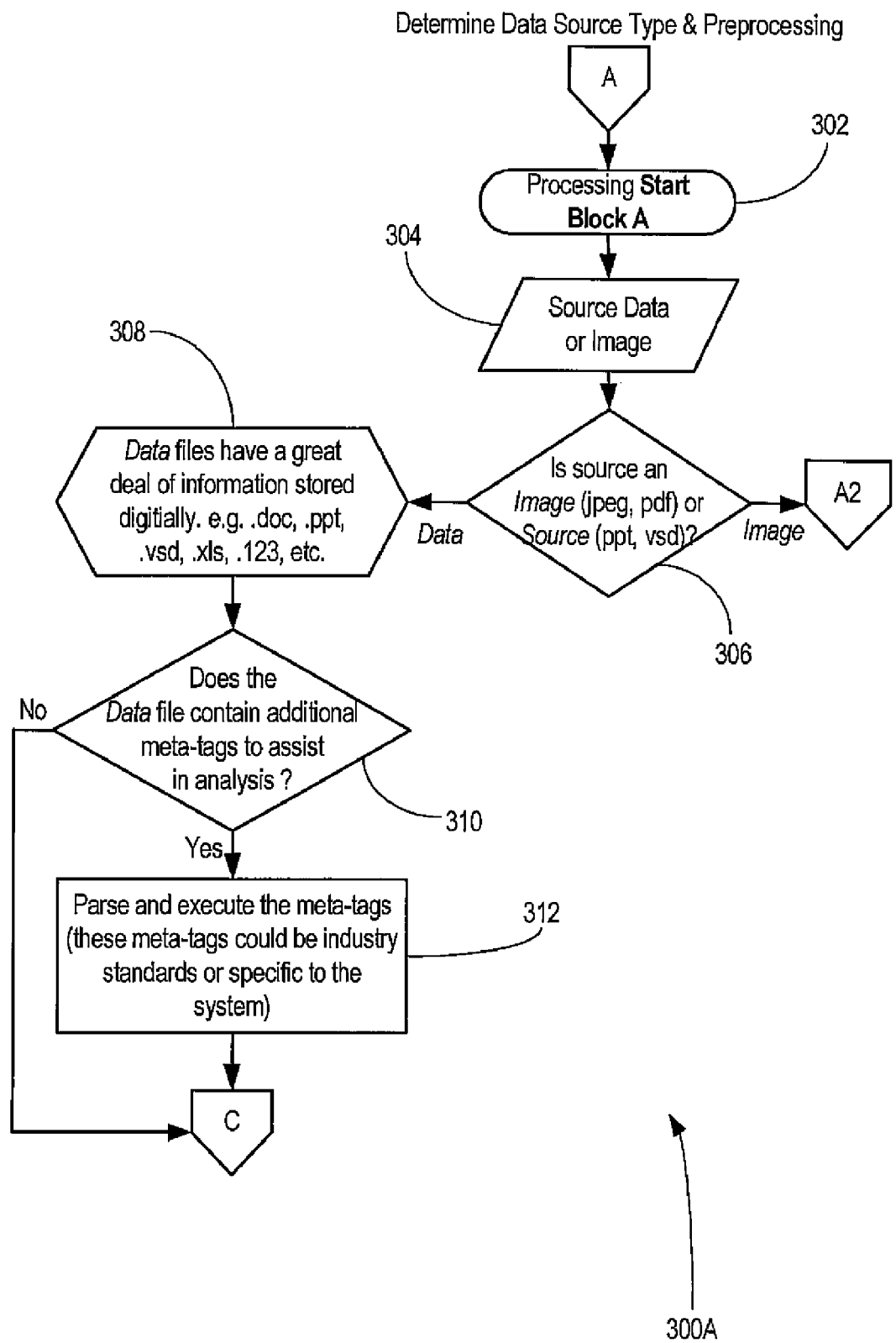
FIGS. 3A and 3B show a schematic flowchart of an illustrative source determining and pre-processing method in accordance with an embodiment of the present invention.
Figure 3B:
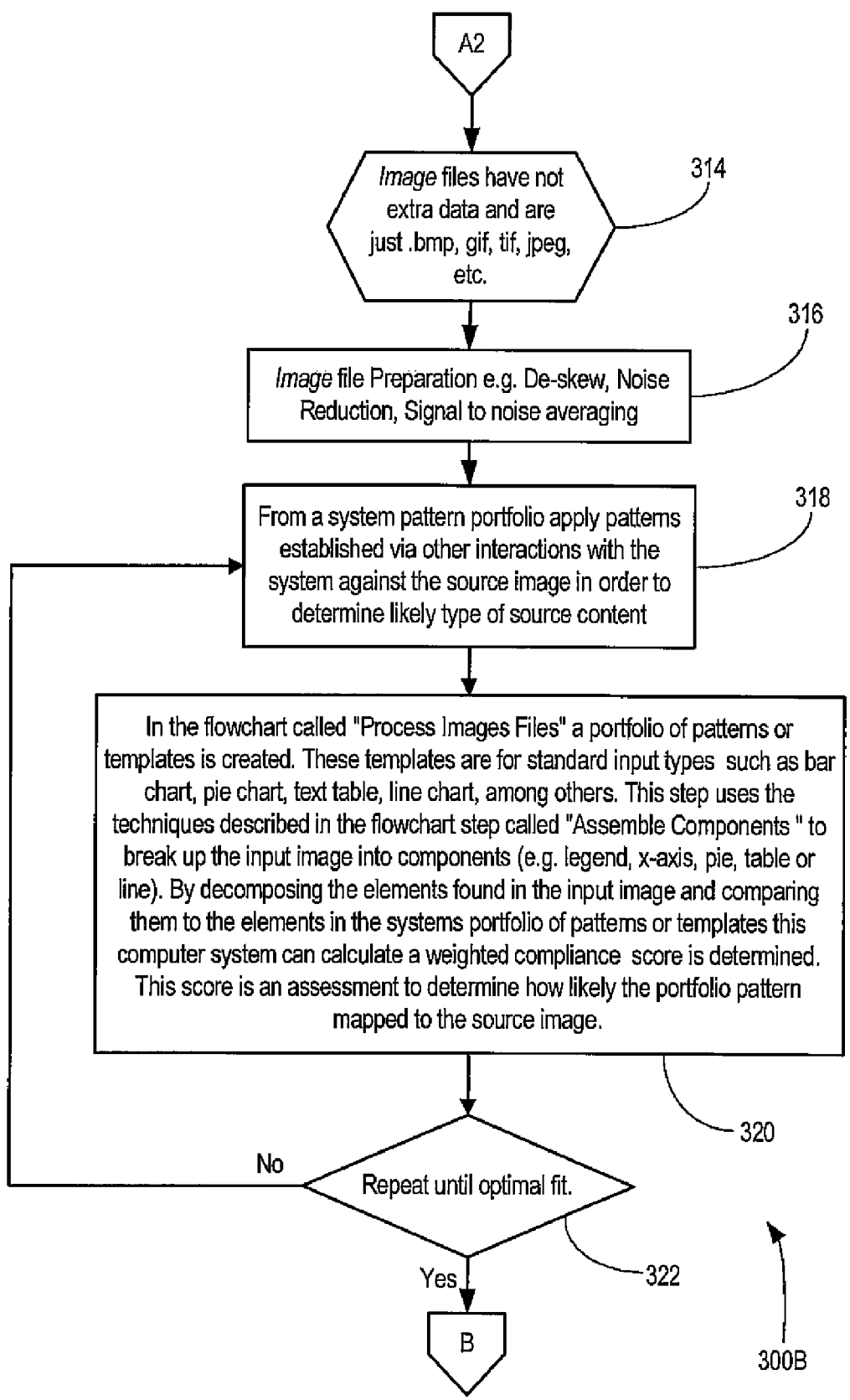

FIGS. 3A and 3B show a schematic flowchart of an illustrative data source determining and pre-processing method 300 in accordance with an embodiment of the present invention. Method 300 begins at block 302, and at block 304 receives the source data or image. At decision block 306, method 300 determines if the source is an image file (e.g., jpeg, pdf) or a data file (e.g., ppt, vsd). If a data file, method 300 proceeds to block 308, where the data files are expected to have additional information stored digitally (e.g., doc, ppt, vsd, xis, 123, etc.). Method 300 then proceeds to decision block 310, where method 300 determines if the data file contains additional meta-tags to assist in the image interpretation. If no, method 300 proceeds directly to block 502 (FIG. 5A) via connector C. If yes, method 300 proceeds to block 312, where method 300 parses and interprets the meta-tags. These meta-tags can be industry standards, or tags specific to the source file types. Method 300 then proceeds to connector C.

If, at decision block 306, the source is instead an image file, method 300 proceeds to block 314 via connector A2 (FIG. 3B). As image files typically have less retrievable meta-data, method 300 proceeds to block 316, where method 300 can prepare the image file for other types of analysis. This preparation can include, for example, de-skewing, noise reduction, signal to noise averaging, etc. Method 300 can then proceed to block 318, where a pattern resulting from the preparation can be compared against patterns or templates stored in a pattern portfolio to determine the likely type of the source image. For example, the pattern or template matching can indicate that the source image is a bar chart, a pie chart, a text table, a line chart, etc. Various techniques for image analysis can be used with the present method are briefly discussed at http://en.wikipedia.org/wiki/Computer vision. For example, various methods for noise reduction are described http://www.mathtools.net/Java/lmage Processing/. Graphic image processes including de-skewing, automatic cropping, automatic border extraction, and removal of noise artifacts are described at http://www.sharewareriver.com/products/6116.htm. Optical character recognition (OCR) techniques are described at http://www.nuance.com/omnipage/professional/ and http://www.csc.liv.ac.uk/~wda2003/Papers/Section IV/Paper 14.pdf. Using contrast techniques to segment items from an image is described at http://www.ph.tn.tudelft.nl/Courses/FIP/noframes/fip-Segmenta.html. Circle and curve determination techniques are described at http://homepages.inf.ed.ac.uk/cgi/rbf/CVONLINE/entries.pl?TAG382. Figure to data conversion line techniques are described at http://ichemed.chem.wisc.edu/iournal/issues/2003/Sep/abs10932.html. Color edge detection techniques for bars graphs, pie charts, etc. are described at http://ai.stanford.edu/~ruzon/compass/color.html. Volume determination (for venn diagrams, pie charts, etc.) are described at http://www.spl.harvard.edu:8000/pages/papers/guttmann/ms/guttmann_rev.html.)

Method 300 then proceeds to block 320, where method 300 processes the source image file based on its likely type. For example, if the source content is a bar chart, a corresponding template for bar charts can be retrieved and the bar chart contents can be analyzed using the template for interpretation and description. Blocks 318 and 320 are repeated as necessary until an optimal fit is achieved in block 322. Flow then passes to block 402 via connector B.

Figure 4:
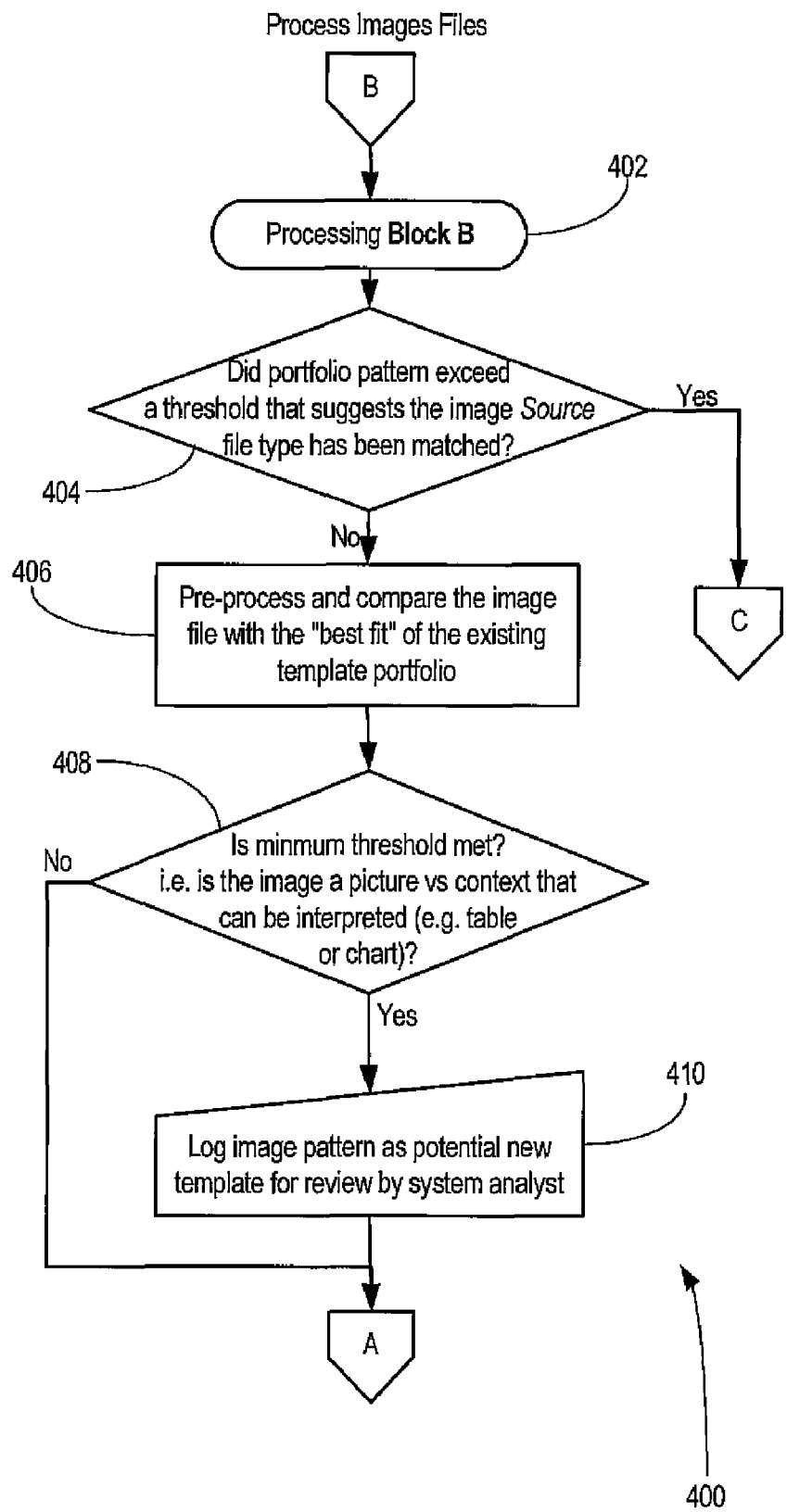
FIG. 4 shows an illustrative image file processing method in accordance with an embodiment of the present invention.

Now referring to FIG. 4, shown is an image file processing method 400 in accordance with an embodiment of the present invention. Method 400 begins at block 402 and proceeds to decision block 404 to determine if a pattern in a pattern portfolio exceeds a predetermined threshold, suggesting that the source image file type has been matched. If yes, method 400 proceeds to block 502 (FIG. 5A) via connector C. If no, method 400 proceeds to block 406, where method 400 pre-processes and compares the image file with the "best fit" pattern from the existing pattern portfolio. Method 400 then proceeds to decision block 408.

At decision block 408, if a minimum threshold cannot be met, the image cannot be interpreted and described (e.g., the image can be of an abstract painting, or a sketch drawn freehand), and method 400 returns to block 302 via connector A. If, at block 408, the minimum threshold can be met, method 400 proceeds to block 410. At this step 410, the system can log the image as a potential new pattern and without any further processing, flow passes to block 302 via connector A. At the end of the process, the list of potential new pattern images can be reviewed (e.g., by a system analyst), and new templates for data extraction based on the pattern can be generated. These new templates can then be saved in the pattern portfolio, so they can be used in the next rounds of automated processes.

Figure 5A:
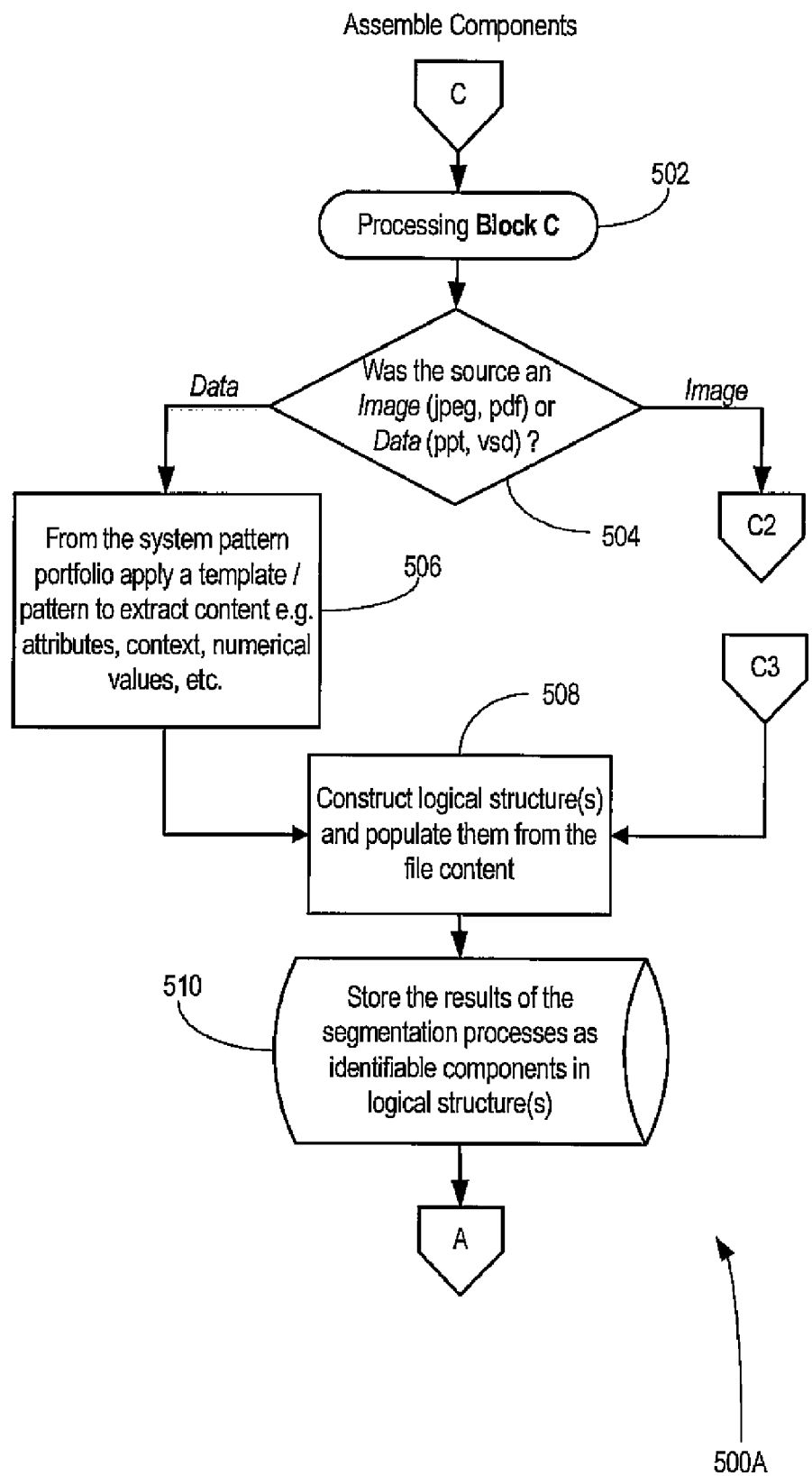
FIGS. 5A and 5B show a schematic flowchart of an illustrative component assembly method in accordance with an embodiment of the present invention.
Figure 5B:
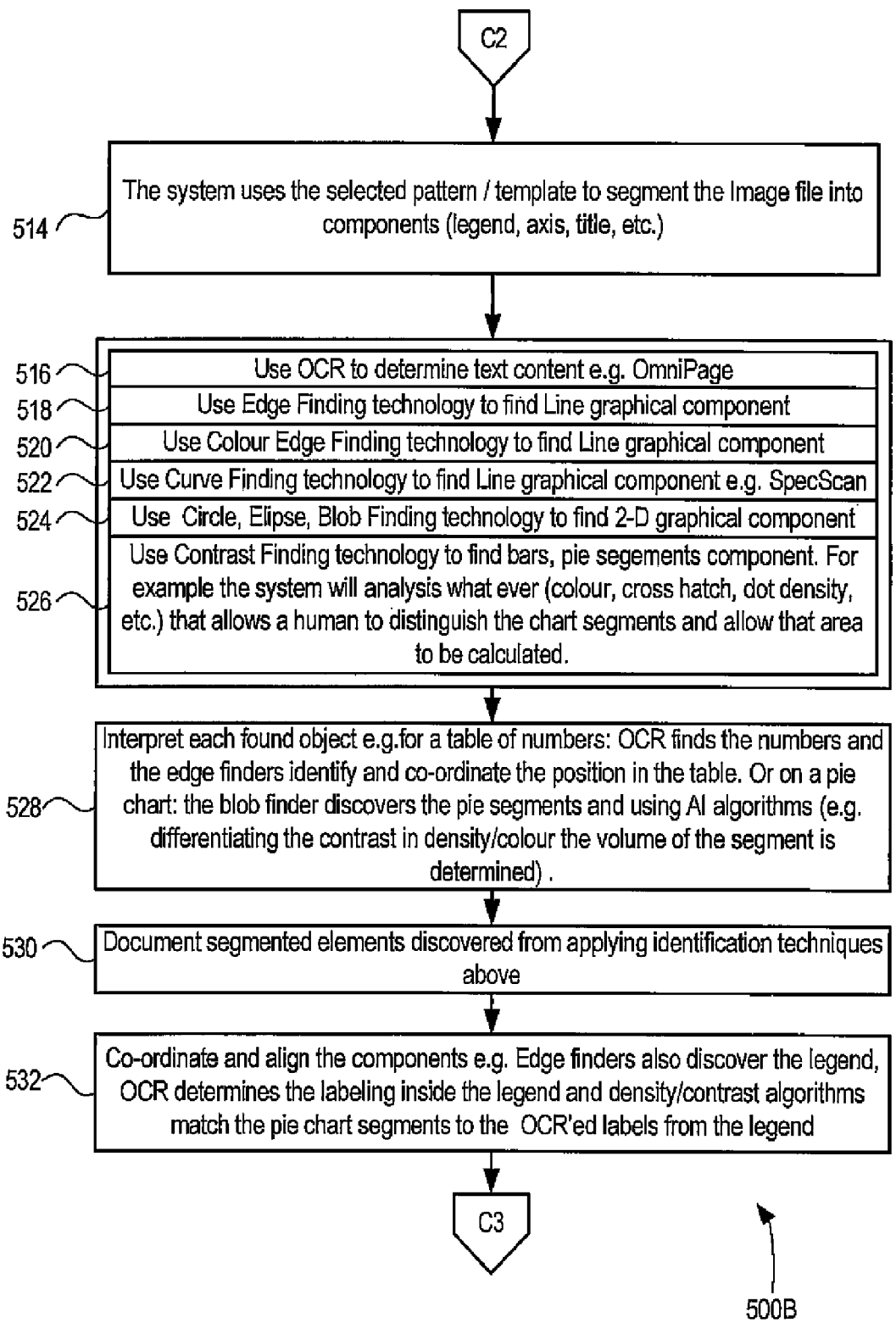

Now referring to FIGS. 5A and 5B, shown is a schematic flowchart of a component assembly method 500 in accordance with an embodiment of the present invention. Method 500 begins at block 502 and proceeds to decision block 504, where method 500 determines if the source file is an image file (e.g., jpeg, pdf) or a data file (e.g., ppt, vsd).

If a data file, method 500 proceeds to block 506, where method 500 applies a template to extract content from the data, including attributes, context, numerical values, etc. For example, a template for an x-y graph can extract information such as titles, name of the x-axis, name of the y-axis, details for lines drawn in the chart, and any labels for the lines. It will be appreciated that the templates can be drafted for each specific type of data file in order to extract key information.

Method 500 then proceeds to block 508, where method 500 can construct logical text structures, and populate them from the data extracted using the template. For example, in order to describe an x-y graph, the text structures can include the title, name of the x-axis, name of the y-axis, and text structures to describe straight lines by their slopes and relative positions in the x-y graph. Method 500 then proceeds to block 510, where method 500 can store the results of the segmentation processes as identifiable components in the logical structures. Method 500 then proceeds to block 302 (FIG. 3A) via connector A.

FIG. 5B shows the steps of method 500 if, at decision block 504, the source file is an image file. Method 500 proceeds to block 514 via connector C2 where a selected pattern or template is used to segment the image file into components (e.g., legend, axis, title, etc.).

Method 500 then proceeds to one or more of blocks 516, 518, 520, 522, 524, 526 to interpret the image file. For example, at block 516, method 500 can use OCR to determine the text content. At block 518, method 500 can use edge finding technology to find a line graphical component. At block 520, method 500 can use color edge technology to find a line graphical component. At block 522, method 500 can use curve finding technology to find a curved line graphical element. At block 524, method 500 can use circle, ellipse, and blob finding technology to find 2-D graphical components. At block 526, method 500 can use contrast finding technology to find bars, pie segments, etc.

Method 500 then proceeds to block 528, where method 500 can interpret each found object for numbers, labels, or other attributes such as the relative position of bars from left to right, relative percentages of pie segments, etc. Method 500 then proceeds to block 530, where method 500 can document segmented elements discovered from applying one or more analysis techniques as described above. Method 500 then proceeds to block 532, where method 500 can coordinate and align the components. Method 500 then proceeds to block 508 (FIG. 5A) via connector C3 as described above and continues.

Now referring to FIG. 6, shown is a schematic flowchart of an audio pre-processing method 600. Method 600 begins at block 602 and proceeds to block 604 to receive an audio recording as an input. Method 600 then proceeds to block 606, where method 600 divides the audio program into a vector of audio clips, each audio clip ends at a natural pause in the speech, such as the end of a sentence, and close to a fixed length (e.g., 30 seconds).

Method 600 then proceeds to block 608, where method 600 continues for each audio clip. Method 600 proceeds to block 610, where voice recognition techniques can be used to translate the audio clip into text. At block 612, method 600 can then use a natural language parser to parse the translated text. Method 600 can then produce a noun phrases vector that contains 0 to n noun phrases extracted from the audio clip. Method 600 then proceeds to block 616, where method 600 maps certain common names or names not found in a dictionary to words in the dictionary. Method 600 then proceeds to block 618, where method 600 calculates the importance value of each noun phrase, and removes less meaningful ones. Method 600 then proceeds to block 620, where method 600 produces a keywords vector for the audio clip that contains 0 to n keywords. Method 600 then proceeds to decision block 622 to determine if there are more audio clips. If yes, method 600 returns to block 608 and continues. If no, method 600 proceeds via connector E to block 702 of method 700 of FIG. 7.

Figure 7:
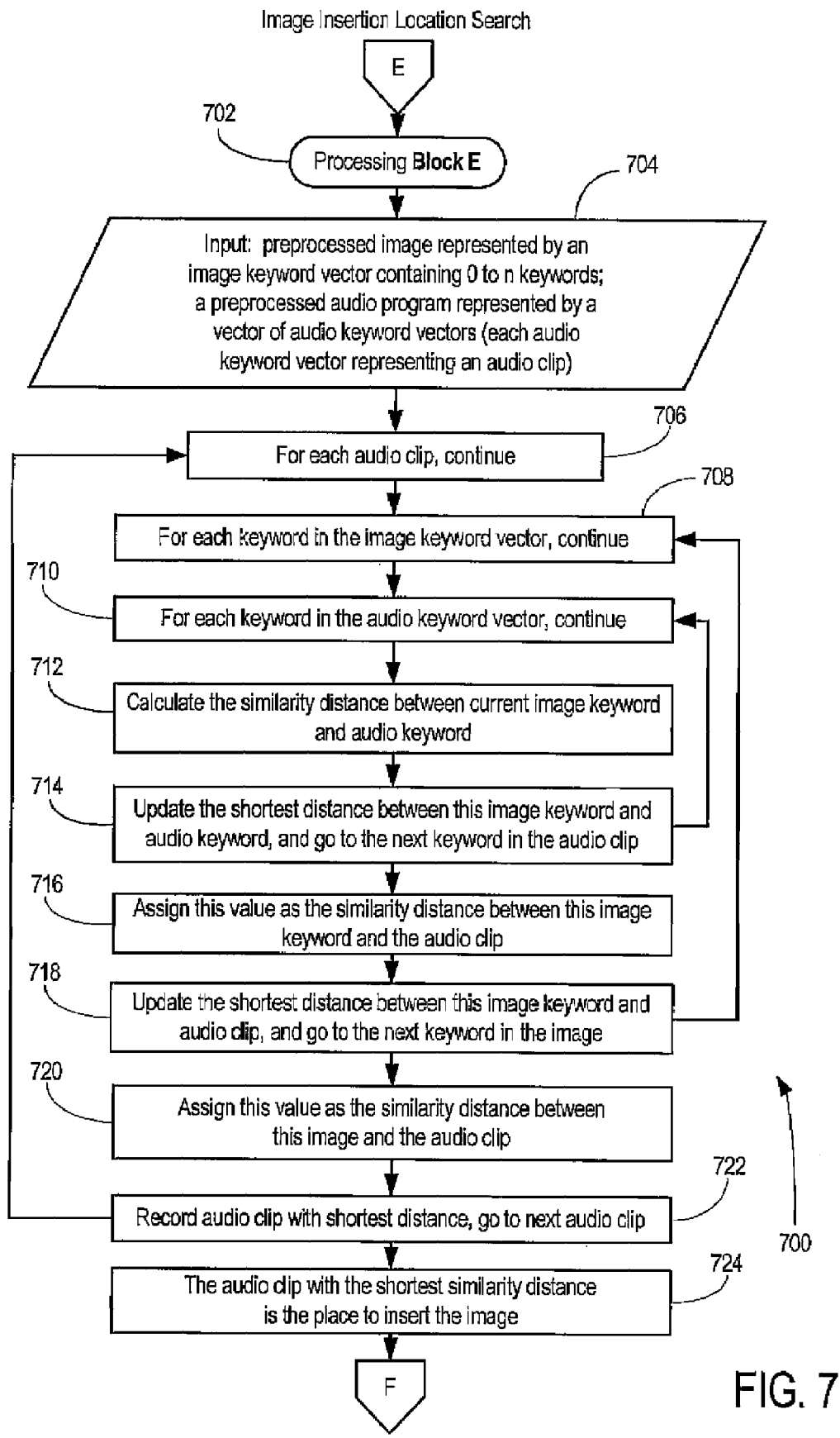
FIG. 7 shows a schematic flowchart of an illustrative image insertion location search method in accordance with an embodiment of the present invention.

Now referring to FIG. 7, shown is an image insertion location search method 700 in accordance with an embodiment. Method 700 begins at block 702, and proceeds to block 704, where method 700 receives as an input a pre-processed image represented by an image keyword vector containing 0 to n keywords, and a pre-processed audio program represented by a vector of audio clip keyword vectors (where each audio clip keyword vector represents an audio clip).

Method 700 then proceeds to block 706, where method 700 continues for each audio clip in the audio program. At block 708, method 700 continues for each keyword in the image keyword vector. Method 700 then proceeds to block 710, where method 700 continues for each keyword in an audio keyword vector representing an audio clip. Method 700 then proceeds to block 712, where method 700 calculates the similarity distance between the current image keyword and audio keyword. At block 714, method 700 updates the shortest distance between this image keyword and audio keyword, and goes to the next keyword in the audio clip, if present, by returning to block 710. If not, method 700 proceeds to block 716 where method 700 assigns this shortest distance value as the similarity distance between this image keyword and audio clip. Method 700 then proceeds to block 718, where method 700 updates the shortest distance between this image keyword and audio clip, and goes to the next keyword in the image, if present, by returning to block 708. If not, method 700 proceeds to block 720, where method 700 assigns this shortest distance value as the similarity distance between this image and the audio clip. Method 700 then proceeds to block 722, where method 700 records the audio clip with the shortest distance, and goes to the next audio clip, if present, by returning to block 706. If not, method 700 proceeds to block 724, where method 700 identifies the audio clip with the shortest similarity distance to the image as the place to insert the image. Method 700 then proceeds to block 802 (FIG. 8) via connector F.

Figure 8:
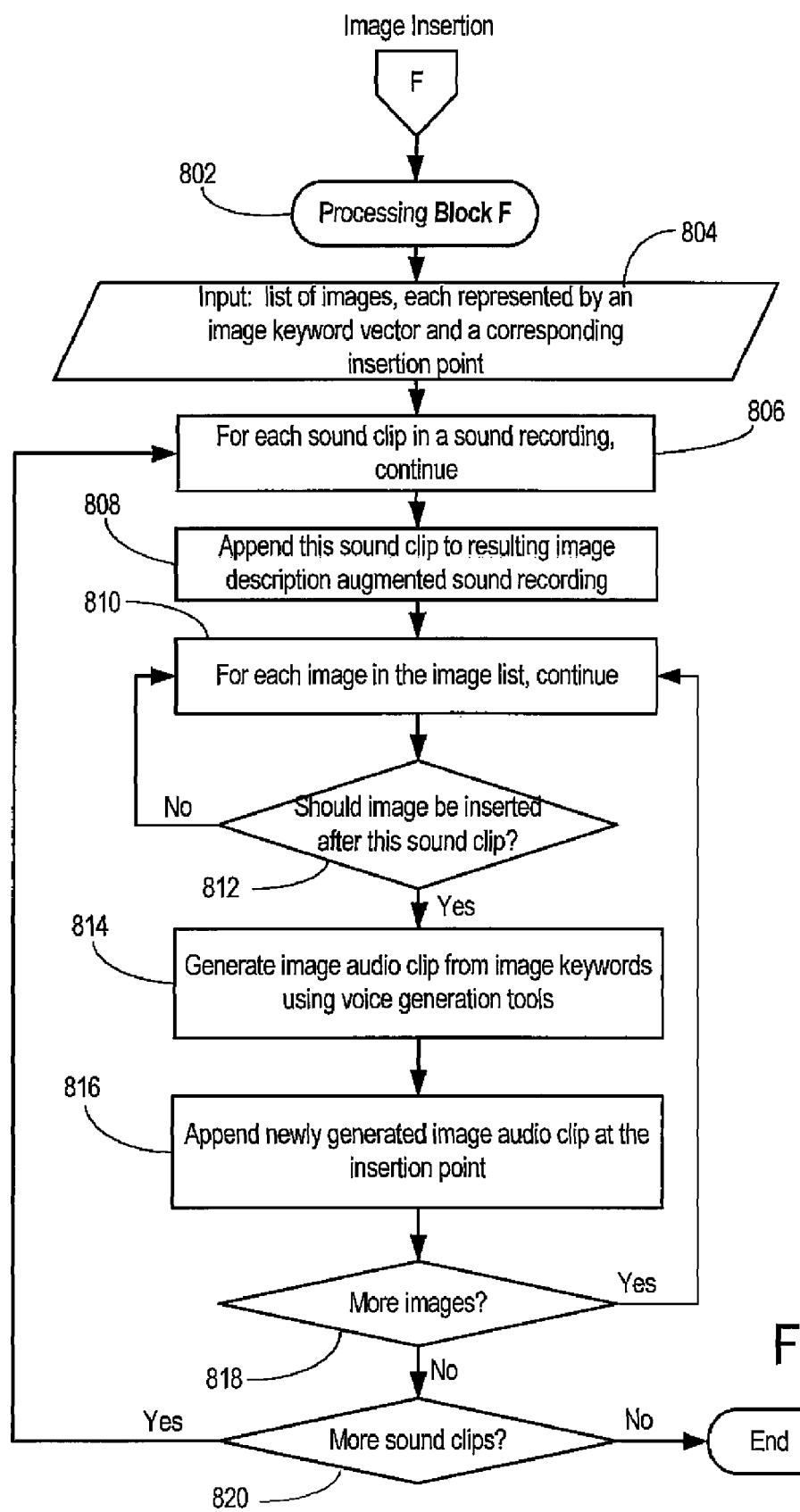
FIG. 8 shows a schematic flowchart of an illustrative image insertion method in accordance with an embodiment of the present invention.

Now referring to FIG. 8, shown is an image insertion method 800 in accordance with an embodiment. Method 800 begins at block 802 and proceeds to block 804 to receive an input of a list of images, each image represented by an image keyword vector and a corresponding insertion point. Method 800 then proceeds to block 806, where method 800 continues for each sound clip in a sound recording. Method 800 then proceeds to block 808 to append this sound clip to the resulting image description augmented sound recording.

Method 800 then proceeds to block 810 to continue for each image in the list of images. Method 800 then proceeds to decision block 812 to determine if the image should be inserted after the current sound clip. If no, method 800 returns to block 810. If yes, method 800 proceeds to block 814 to generate an image description audio clip from the image keywords using voice generation tools. Method 800 then proceeds to block 816, where method 800 appends the newly generated image description audio clip at the identified insertion point. Method 800 then proceeds to decision block 818 to determine whether to return to block 810, or to proceed to decision block 820. At decision block 820, method 800 determines whether to return to block 806, or to end.

As will be appreciated, the above described methods identify and describe images in text and audio, locate the appropriate point of insertion in the original audio recording using similarity distances calculated based on keywords, and insert the image description at the appropriate identified location. Thus, images that would otherwise not be viewed by a listener of the audio recording will now be described in an image description audio clip inserted into and augmenting the original sound recording.

EXAMPLE

Figure 9:
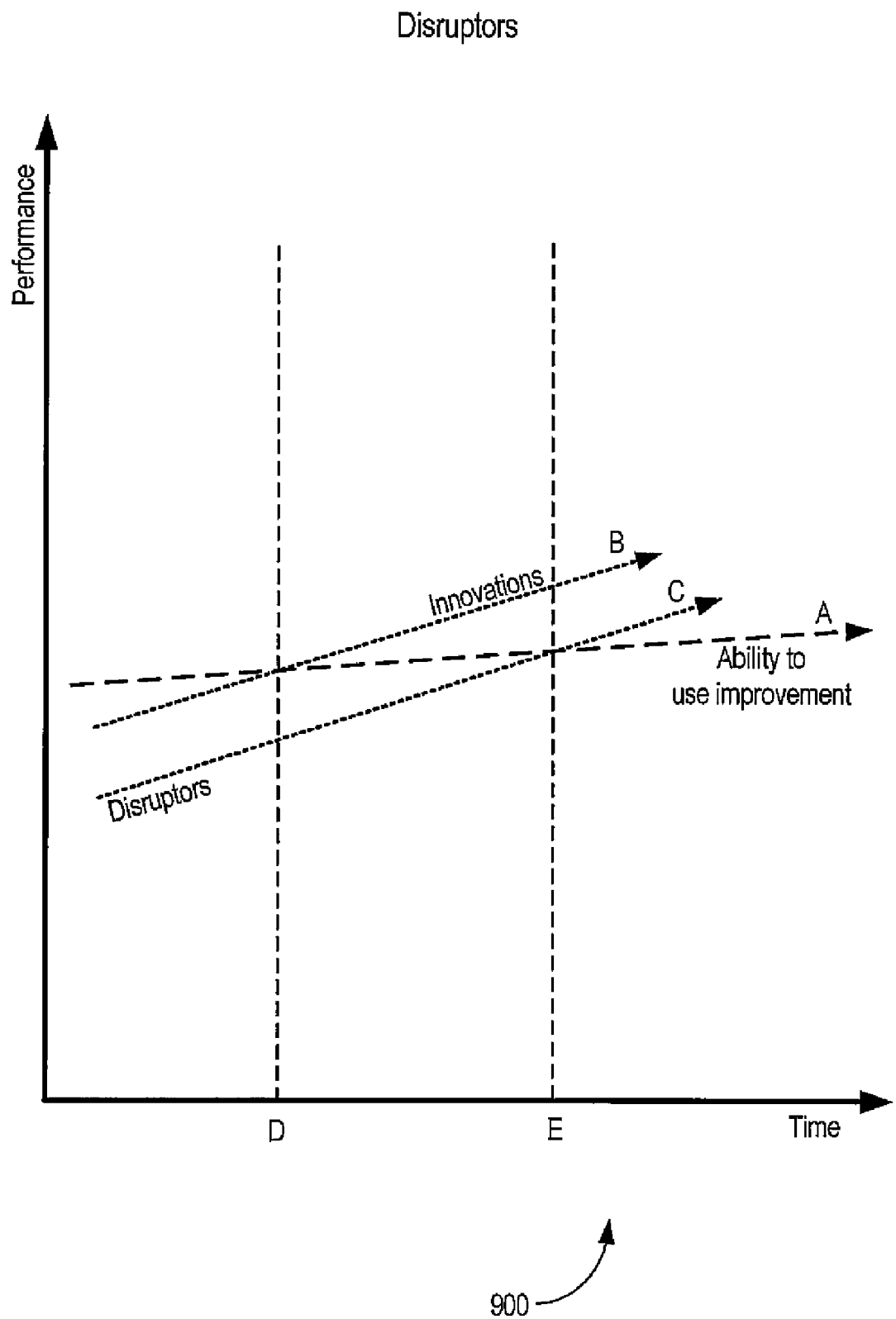
FIG. 9 shows an illustrative example of an image that can be identified and described in accordance with an embodiment of the present invention.

FIG. 9 shows an illustrative example of a graphic image 900, that can be identified and described using the method as described above.

For example, in an audio recording of a lecture, the lecturer can refer to a number of graphics or charts, such as the graphic image 900 shown in FIG. 9. At some point in the lecture, e.g., at a time reference of 10:25 am, the lecturer can make reference to a chart with the title "disruptors". Then at 10:30 am he can say "diagram" and "line" which can be interpreted as him referring to a line chart. He can also specifically says at 10:35 am "to keep the diagram simple I'll just depict that ability to use improvement as a single line . . . ."

In accordance with an embodiment, the system can imbed an interpreted description of the chart 900 at 10:30 am, which can state the following: Title: "disruptions", X-axis: "time", Y-axis: "performance". Line A with a slope of about 10° entitled "Ability to use improvement". Line B with a slope of about 25° entitled "Innovations". Line B intersects Line A at time D. Line C with a slope of about 25° entitled "Disruptions". Line C intersects line A at time E.

As will be appreciated, a system and method that can interpret charts such as chart 900 and provide a verbal description can provide a listener with more context to understand the lecture than if such information was not provided. While various illustrative embodiments of the invention have been described above, it will be appreciated by those skilled in the art that variations and modifications can be made. Thus, the scope of the invention is defined by the following claims.

What is claimed is:

1. A method of inserting a description of an image into an audio recording, comprising:
    interpreting, using a computer device, an image, including:
        applying a template to the image to extract file content;
        constructing a logical structure from the image;
        populating the logical structure with the extracted file content; and
        producing a word description of the image including at least one image keyword from the interpreted image;
    parsing, using the computer device, an audio recording into a plurality of audio clips;
    producing a transcription of each audio clip;
    extracting a plurality of noun phrases from the transcription;
    calculating an importance value for each noun phrase and identifying at least one audio keyword based upon the importance value;
    calculating, using the computer device, a similarity distance between the at least one image keyword and the at least one audio keyword of each audio clip; and
    selecting, using the computer device, the audio clip transcription having a shortest similarity distance to the at least one image keyword as a location to insert the word description of the image.

2. The method of claim 1, further comprising:
    appending the word description of the image to the selected audio clip to produce an augmented audio recording including at least one interpreted word description of an image.

3. The method of claim 1, further comprising:
    providing at least one template to interpret the image, the at least one template including at least one image interpretation component to produce a word description of the image.

4. The method of claim 3, further comprising:
    providing at least one of optical character recognition technology, edge finding technology, color edge finding technology, curve finding technology, shape finding technology, and contrast finding technology as an image interpretation component in the at least one template.

5. The method of claim 1, further comprising:
    parsing the audio recording into a plurality of audio clips of substantially a same length, and
    adjusting the length of each audio clip to end at a natural pause in speech.

6. The method of claim 1, further comprising:
    calculating the similarity distance between the image and an audio clip by calculating the similarity distance between at least one image keyword of an image and the at least one audio keyword of an audio clip.

7. The method of claim 6, further comprising:
    obtaining the similarity distance between the at least one image keyword and the at least one audio keyword by calculating a path length between the at least one image keyword and the at least one audio keyword in a hierarchical semantic electronic dictionary.

8. A system for inserting a description of an image into an audio recording, comprising:
    a computer hardware device, including:
    an interpreting system for interpreting an image, including:
        applying a template to the image to extract file content;
        constructing a logical structure from the image;
        populating the logical structure with the extracted file content; and
        producing a word description of the image including at least one image keyword from the interpreted image;
    a parsing system for parsing an audio recording into a plurality of audio clips for producing a transcription of each audio clip and for extracting a plurality of noun phrases from the transcription;
    a calculating system for calculating an importance value for each noun phrase and identifying at least one audio keyword based upon the importance value; and calculating a similarity distance between the at least one image keyword and the at least one audio keyword of each audio clip; and
    a selecting system for selecting the audio clip transcription having a shortest similarity distance to the at least one image keyword as a location to insert the word description of the image.

9. The system of claim 8, further comprising:
    an appending system for appending the word description of the image to the selected audio clip to produce an augmented audio recording including at least one interpreted word description of an image.

10. The system of claim 8, further comprising:
at least one template to interpret the image, the at least one template including at least one image interpretation component to produce a word description of the image.

11. The system of claim 10, further comprising:
at least one of optical character recognition technology, edge finding technology, color edge finding technology, curve finding technology, shape finding technology, and contrast finding technology as an image interpretation component in the at least one template.

12. The system of claim 8, wherein the parsing system is configured to parse the audio recording into a plurality of audio clips of substantially a same length, and to adjust the length of each audio clip to end at a natural pause in speech.

13. The system of claim 8, wherein the calculating system is configured to calculate the similarity distance between the image and an audio clip by calculating the similarity distance between at least one image keyword of an image and the at least one audio keyword of an audio clip.

14. The system of claim 13, wherein the calculating system is configured to calculate the similarity distance between the at least one image keyword and the at least one audio keyword based a path length between the at least one image keyword and the at least one audio keyword in a hierarchical semantic electronic dictionary.

15. A program product stored on a non-transitory computer readable medium, which when executed, inserts a description of an image into an audio recording, the non-transitory computer readable medium comprising program code for:
interpreting an image, including:
applying a template to the image to extract file content;
constructing a logical structure from the image;
populating the logical structure with the extracted file content; and
producing a word description of the image including at least one image keyword from the interpreted image;
parsing an audio recording into a plurality of audio clips;
producing a transcription of each audio clip;
extracting a plurality of noun phrases from the transcription;
calculating an importance value for each noun phrase and identifying at least one audio keyword based upon the importance value;
calculating a similarity distance between the at least one image keyword and the at least one audio keyword of each audio clip; and
selecting the audio clip transcription having a shortest similarity distance to the at least one image keyword as a location to insert the word description of the image.

16. The program product of claim 15, further comprising program code for:
appending the word description of the image to the selected audio clip to produce an augmented audio recording including at least one interpreted word description of an image.

17. The program product of claim 15, further comprising program code for:
providing at least one template to interpret the image, the at least one template including at least one image interpretation component to produce a word description of the image.

18. The program product of claim 17, further comprising code for:
providing at least one of optical character recognition technology, edge finding technology, color edge finding technology, curve finding technology, shape finding technology, and contrast finding technology as an image interpretation component in the at least one template.

19. The program product of claim 15, further comprising program code for:
parsing the audio recording into a plurality of audio clips of substantially a same length, and adjusting the length of each audio clip to end at a natural pause in speech.

20. The program product of claim 15, further comprising program code for:
calculating the similarity distance between the image and an audio clip by calculating the similarity distance between at least one image keyword of an image and the at least one audio keyword of an audio clip.

21. The program product of claim 20, further comprising program code for:
obtaining the similarity distance between the at least one image keyword and the at least one audio keyword by calculating a path length between the at least one image keyword and the at least one audio keyword in a hierarchical semantic electronic dictionary.

* * * * *